Feb. 4, 1941.   R. BAADER ET AL   2,230,281
FISH-TREATING MACHINE
Filed April 22, 1938   7 Sheets-Sheet 1

INVENTORS
Rudolf Baader
Karl Friedrich Schlichting
BY
ATTORNEYS

Feb. 4, 1941.  R. BAADER ET AL  2,230,281
FISH-TREATING MACHINE
Filed April 22, 1938   7 Sheets-Sheet 2

INVENTORS
Rudolf Baader
Karl Friedrich Schlichting
BY
Cox + Moore
ATTORNEYS

Feb. 4, 1941.  R. BAADER ET AL  2,230,281
FISH-TREATING MACHINE
Filed April 22, 1938   7 Sheets-Sheet 3

INVENTOR
Rudolf Baader
Karl Friedrich Schlichting
BY
Cox & Moore
ATTORNEYS

Feb. 4, 1941.  R. BAADER ET AL  2,230,281
FISH-TREATING MACHINE
Filed April 22, 1938  7 Sheets-Sheet 1

INVENTORS
Rudolf Baader
Karl Friedrich Schlichting
BY
Cox & Moore
ATTORNEYS

Feb. 4, 1941.       R. BAADER ET AL       2,230,281
FISH-TREATING MACHINE
Filed April 22, 1938       7 Sheets-Sheet 5

INVENTORS.
Rudolf Baader
Karl Friedrich Schlichting
BY
Cox & Moore
ATTORNEYS

Feb. 4, 1941.

R. BAADER ET AL 2,230,281

FISH-TREATING MACHINE

Filed April 22, 1938

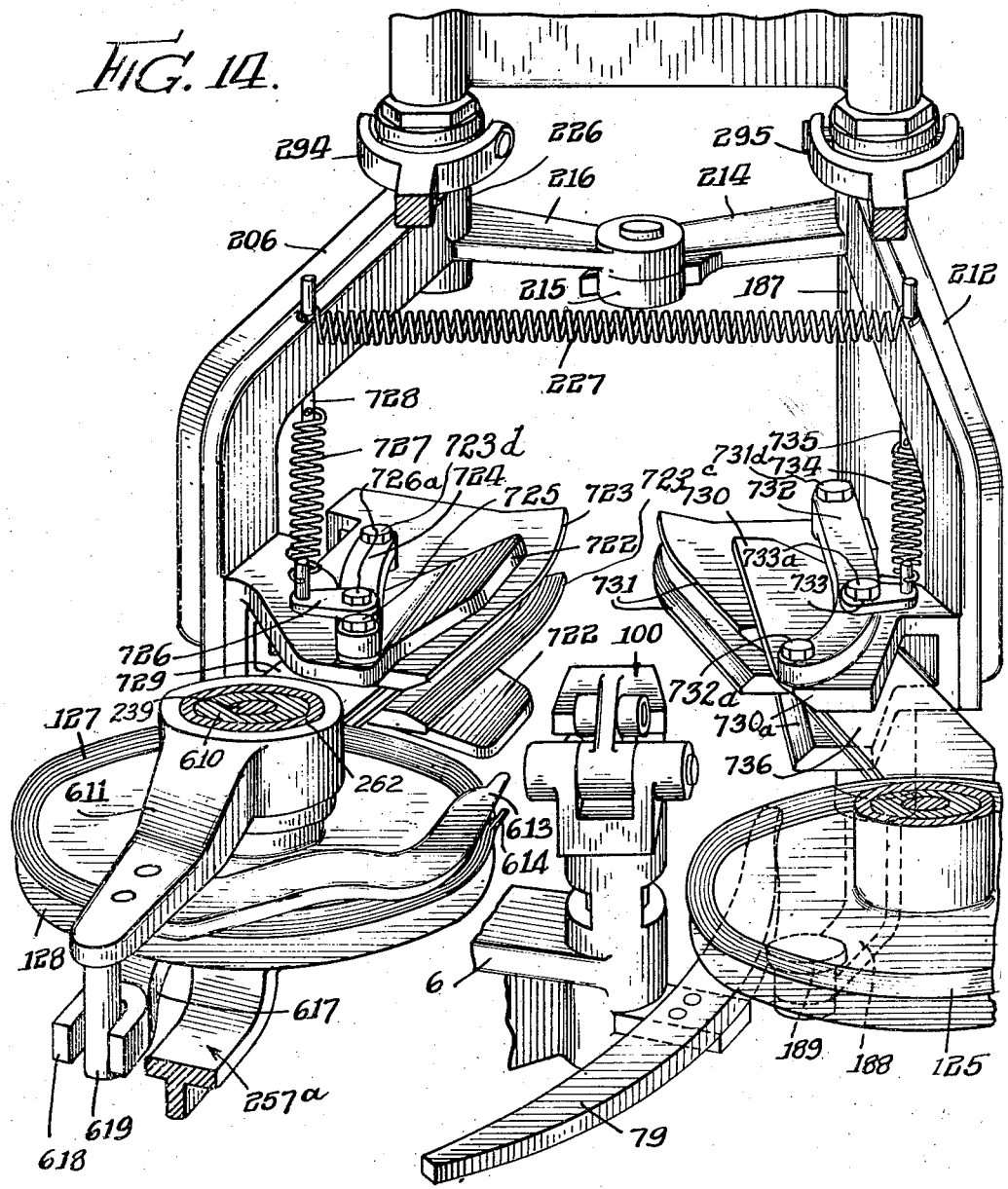

Patented Feb. 4, 1941

2,230,281

UNITED STATES PATENT OFFICE 2,230,281

FISH-TREATING MACHINE

Rudolf Baader and Karl Friedrich Schlichting, Lübeck, Germany

Application April 22, 1938, Serial No. 203,698
In Great Britain March 1, 1937

22 Claims. (Cl. 17—3)

This invention relates to methods of and machines for dressing fish and is particularly applicable to the dressing and filleting of fish of large size such as cod, codling, pollack, and the like. These fish have thick and strong backbones which may not ordinarily be bent to an appreciable degree. Because of the difficulty of bending the backbones such fish can not be handled in the ordinary fish-treating or dressing machines. Furthermore, the fish alter their shapes slightly under the influence of gravity and when resting on their sides cease to be symmetrical and can not be dressed with accuracy. Action on both dorsal and ventral surfaces of such fish is important in the production of fillets. The fish to be dressed vary in size.

In the United States Letters Patent No. 2,180,303, dated November 14, 1939, and issued to Rudolf Baader, one of the applicants of the present application, there are described a method and machine for dressing fish of the kind described. An important object of the present invention is to provide improved guides for use in the said prior machine. Further objects include, among others, the use of the fins on the fish for guiding purposes, the provision of improved guides for leading the fins cleanly between cutting knives, the provision of improved means for correcting the distortion of bones that have become twisted or deformed in storage of the fish, and the provision of improved means for detaching the flesh close to the backbone.

In the said prior machine large fish, such as cod, are clamped at the tail and drawn tail-first past knives which make filleting cuts in the fish, and the fish is engaged immediately in front of the knives by one or more resiliently mounted guides which exert a braking action on the fish, so that the fish is fed to the knives with a substantially straight backbone. Further, in the said prior machine the fins of the fish are removed before the filleting cuts are made.

We have now found it desirable to modify the arrangement and construction of the guides with V-shaped mouths described in the said Patent No. 2,180,303. A guide that will properly engage the thin part of a fish close to the tail has too narrow a mouth to engage the later and thicker part satisfactorily. Accordingly we now make a guide in two parts arranged to move relatively to one another, one part having a narrow V-mouth and the other a wider V-mouth. The mounting is such that the narrow V-part can move away from the fish towards the wider V-part under pressure exerted by the fish, so that when the narrow part of the fish is in the guide it is engaged by the narrow V-part, and as the fish thickens it forces the two parts to move relatively so that the wider V-part comes into engagement with the fish.

We have also found that the removal of the fins tends to weaken the body of the fish, and that it is better to leave the fins on the fish and to make use of them in the guiding of the fish. For this purpose we use a pair of thin plates to guide the fins between a pair of parallel knives, and we mount such fin plates so that they move away from one another to let the tail clamp pass and then move back in two movements, namely a movement which brings the ends of the plates that are nearer to the oncoming fish into engagement with the fish before the tail clamp has wholly cleared the guide, and a movement which brings the far ends of the guides into engagement with the fish when the tail clamp has cleared the guide. In this way we ensure that the fish is engaged by the guides at the earliest possible moment, whereas if it were necessary to allow the tail clamp to pass clear of the whole guide before any inward movement of the guide took place the fish would remain unguided for longer than is desirable, and indeed the leading parts of the fins might not enter the gap between the plates at all.

We find it convenient to provide the fin plates within the V-guides, which themselves may each consist of two plates. Thus, our invention includes not only fin guides but also other plate guides mounted to move towards the fish in the way described. Further, we prefer to provide guides consisting of fin plates within V-guides on each side of the fish.

Other features of our invention relate to the severance of the flesh from the backbone. In such fish as cod, the flesh in the neighbourhood of the backbone is united to the bones largely by a gelatine-like substance. Further, the backbone is essentially triangular in shape on the back of the fish so that knives that work in planes parallel to the longitudinal plane of symmetry of the fish cannot cut exactly along the backbone.

In order to sever the flesh cleanly from the backbone, the flesh in the neighbourhood of the backbone is lifted off that bone by finger-like members which act in planes coincident with or spaced closer together than those which contain the cutting edges of a pair of parallel knives that make filleting cuts, one on each side of the backbone, and these members act ahead of the knives so that in the neighbourhood of the backbone the knives pass idly through gaps made by the finger-like members. By this means a very smooth severance is made along the backbone without any loss of flesh. As the finger-like members do not exert a cutting action and are not merely additional knives, not only need they have no cutting edges, but preferably they are made blunt.

A further important effect is obtained by means of the finger-like members. Some fish, particularly those that have been kept in cold storage for a little time, have twisted or deformed backbones which are not straightened even when the fish is accurately and symmetrically presented by external guides to parallel knives arranged in pairs. Thus, V-shaped guides that receive the back and belly fins may engage the fish at the back and belly sides and to all appearances wholly straighten the fish so that the back and belly fins lie in the same plane. Nevertheless, within the fish the backbone may be twisted through a small angle so that the spike-like bones that project from it do not lie in the plane just referred to. When such a fish is cut the knives tend to foul the spike-like bones. When finger-like members as defined above are used, they bear on the roots of the spike-like bones and, in moving along the backbone from one spike-like bone to the next, they serve to correct the angle of the spike-like bones successively. In so doing they bring the whole of each spike-like bone including the tip, which, of course, is the most displaced from the true centre line, into the gap between the knives. In order to ensure that such correction of distortion takes place, we prefer to bend the forward edge of each finger slightly outwards so that each pair of fingers presents a slightly flaring mouth which will receive the spike-like bones more easily than a narrow mouth.

It will be understood that it is only over a part of the cutting edge of each knife that the finger leads the knife. This part is that closest to the backbone and it may advantageously extend for about half an inch up the spike-like bones from the backbone.

We prefer to use disc knives with bevelled edges, and to fix a finger to each knife bearing so that its inner surface is very nearly in contact with the outer surface of the knife. For this purpose the finger must, of course, be bent and it is so shaped that its nose projects beyond the periphery of the knife with its inner surface substantially in the same plane as the cutting edge of the knife. Although such a finger has a blunt nose that is not exactly parallel to the direction of travel of the fish we have found that it will in practice puncture the skin of the fish. Thus, we are able to avoid the necessity for making cuts in the fish before the angle of the side bones has been corrected if necessary. We are also able to avoid the provision of complicated mechanism for making preliminary cuts.

There may be either one or two pairs of fingers, that is to say, there may be (and preferably is) a pair of fingers only on the back side of the backbone or a pair may also be provided at the belly side.

Part of one machine embodying the present invention and adapted for carrying out the methods thereof is disclosed in the accompanying sheets of drawings hereby made a part of this specification and in which Figures 1, 2, 3 and 4 are plan views of a guide structure designed to replace certain of the guides shown in the said prior patent, the figures showing the structures in four successive operating positions. These figures show the cutting knives more or less diagrammatically in order to illustrate their relative relation to the guide members, the cutting knives being broken away adjacent the guide members to better illustrate the underlying parts.

Figure 8 is an elevational view of the knives, the elevation being taken along a line centrally between the opposite pairs of knives and respective knife supporting structures in a direction facing inwardly toward the center of the machine.

Figure 10 is a section taken on the line X—X of Figure 8.

Figure 14 is a perspective view showing, as a whole, the filleting knives and guide mechanism, the supporting brackets for the knives and other parts having been broken away to clearly show the cooperation of the parts.

Our whole machine is constructed in general as described in the aforesaid prior patent, but the whole fin removing mechanism is omitted. As before the fish is gripped at the tail by a clamp 100 carried by a rotary arm 6, and is engaged by guides which deliver it to two pairs of horizontal rotary disc knives 125, 126, 127 and 128, all these parts being identical with those thus numbered in the aforesaid prior patent and being actuated by drive means described more in detail therein.

Figure 1:
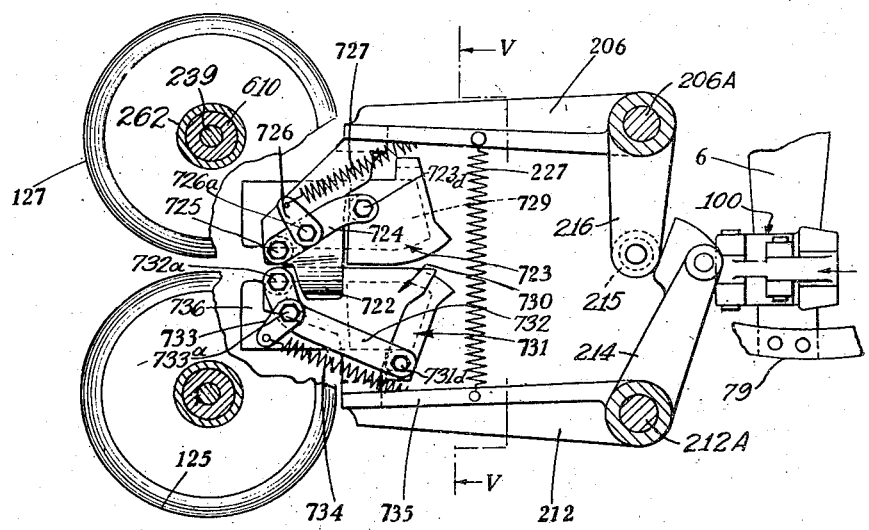

There are two guide assemblies, one on each side of the path taken by the fish, and they replace the guides 210 and 211 shown in the said prior patent. They are carried by levers 206 and 212 which are mounted and operated in exactly the same way as the levers thus numbered in the prior patent. Although a few (but not all) of the parts for operating these levers are shown, no further description of them will be given, except that as the arm 6 and tail clamp 100 approach, the levers 206 and 212 are rocked against the action of a spring 227. This moves the parts from the position shown in Figure 1 to that shown in Figure 2, and moves the guides proper far enough apart to allow the tail clamp 100 to pass between them.

Each guide proper consists of three parts. On the inner side of the fish track the first of these parts consists of a pair of plates 722 rigid with the lever 206 and being flared at the ends which are remote from the lever 206 to form a wide V-mouth capable of receiving the back of a relatively large fish. The second of these parts comprises a guide member indicated generally by the reference numeral 723 and comprising a pair of spaced plates relatively closer together than the aforementioned plates 722. The plates 723a forming the guide unit 723 are joined together at their right-hand sides, as viewed in Figure 5, by means of the web or wall portion 723b, so that at this point the guide is of generally U-shaped sectional configuration. The edges of the guide opposite the wall section 723b are beveled or chamfered on their inner sides as at 723c to provide relatively narrow fish engaging guide portions. The guide assembly 723 is carried by lever 724, which is pivotally mounted on the upper of the guide plates 722 by means of the pivot screw 725, see Figures 1 to 4. The guide member 723 is securely rigidly to the lever 724 by means of the machine screw 723d. It will be evident that the guide member 723 presents a relatively narrow V-mouth at bevels 723c capable of properly and securely engaging a fish adjacent the tail end where the body is relatively narrow. The narrow of V-mouth of the member 723 is, however, too narrow to engage the thick part of the back of a big fish for guiding purposes and thus merely bears against such portions of a fish brought in contact therewith.

An arm 726 fixed to the bar 724 by means of a machine screw 726a is anchored to one end of a spring 727 which is weaker than the spring 227, and the other end of which is anchored to the pin 728 on the member 206. The spring 727 urges the guide member 723 in a clockwise direction relatively to the lever 206. The third guide part consists of two thin sheet metal plates 729 arranged parallel to one another and just far enough apart from one another for the fin of the fish to pass between them. There is clearly shown in Figures 2, 3, 4, 6 and 7 a more or less diagrammatical representation of a codfish at various stages during its passage adjacent the plates 729. It will be seen that the metal plates 729 engage on opposite sides of the dorsal fins. In all operating positions the tail ends of these plates 729 project between the disc knives, whereas the plates of each pair of plates 722 and 730 are spaced far enough apart from one another for the disc knives to work between them. The plates may be welded or otherwise secured rigidly flatwise to the inner faces of the plates 723a as clearly shown in Figures 1 to 7. It will be understood that the pairs of knives are swung apart from one another to let the tail clamp pass between them in the manner described in the aforesaid prior application.

Figure 2:
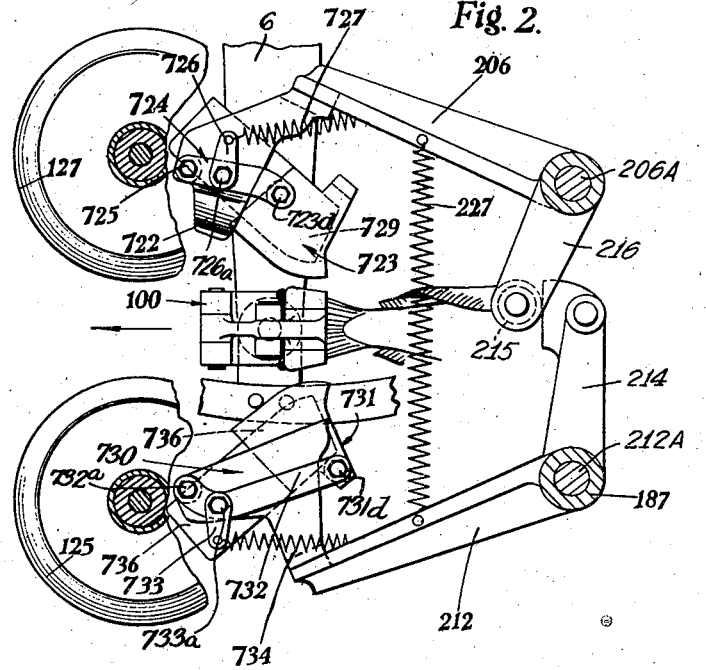

When the levers 206 and 212 have been swung into the position shown in Figure 2, the guide member 723 rocks relatively to the guide plates 722 under the influence of the spring 727 and carries the guide plates 729 with it, as the plates 729 are made rigid with the member 723.

The guides proper on the outer side closely resemble those just described. The lever 212 carries, affixed rigidly thereto, a pair of parallel spaced plates formed as a unit and designated by the reference numeral 730. The pair of plates extend away from the lever 212, as shown in Figures 1 to 7, inclusive, and are beveled or chamfered at their extremities as at 730a to present a generally V-shaped guiding mouth that is wider than the guide mouth presented by the guide member 723 heretofore described, but relatively narrower than the guiding mouth presented by the flared plates 722. These guide plates 730 are designed to enter the belly cavity of the fish.

The second guide part on the outer side consists of a guide member indicated generally by the reference numeral 731 substantially identical with the guide member 723, previously described, and carried by a lever 732 which is pivotally mounted on the upper guide plates 730 by means of the pivot screw 732a. The guide member 731 in general comprises a pair of spaced parallel plates 731a joined adjacent their left-hand extremities, as viewed in Figure 5, by means of the transversely extending wall portion 731b. Along their free extremities the opposed plates or walls 731a are bevelled or chamfered on their inner sides as at 731c. The guide member 731 is rigidly secured to the lever 732 through the agency of a machine screw 731d. The lever 732 carries an arm 733 rigidly secured thereto in the position shown in Figures 1 to 4 by means of a machine screw 733a. The arm 733, at a point spaced from the lever 732, is secured to the end of spring 734, the other end of which is anchored, as at 735, on the lever 212. The free guide part on the outer side of the machine comprises two sheet metal plates 736 generally identical in configuration and serving an analogous purpose to plates 729. The plates 736 are welded or otherwise secured flatwise against the inner faces of the walls or plates 731a.

Figure 3:
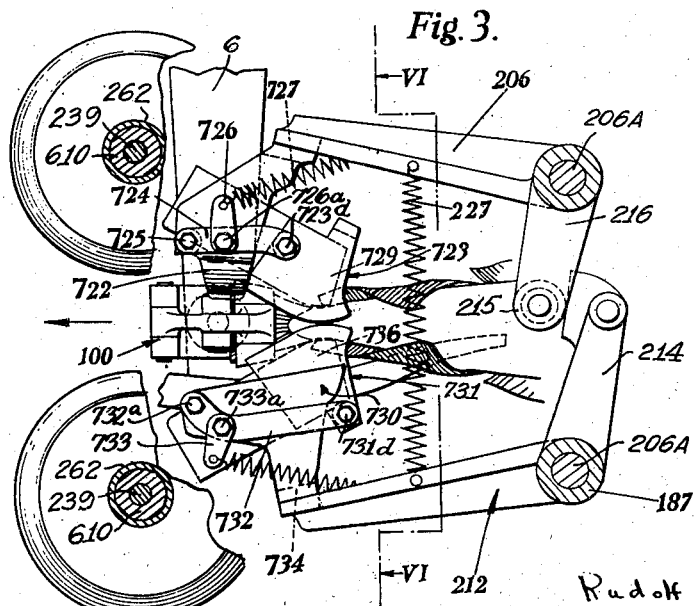

As the levers 206 and 212 are allowed to move back again the various parts take up the position shown in Figure 3. It will be seen that the guide parts 723 and 731 have engaged the tail end of the fish and that the ends of the guide plates 729 and 736 are engaging the fins. Thus, as hereinbefore pointed out, the spaced guide plates 729 extend on either side of the dorsal fin while the pair of plates 736 oppositely engage the anal fins on the lower portion of the fish. In Figure 3 the fins are illustrated as bent, as sometimes happens, and it is important that the guide plates 729 and 736 should come into operation at the earliest possible moment in order to engage the beginnings of the fins and thus be able to straighten any bent fins. In the position shown in Figure 3 the tail clamp 100 is not clear of the whole guide structure, but owing to the rocking permitted by the pivotal mounting of the guide members 723 and 731 these parts are able to engage the fish while the plates 722 and 730 are still far enough apart from one another to allow the tail clamp to pass between them.

Figure 4:
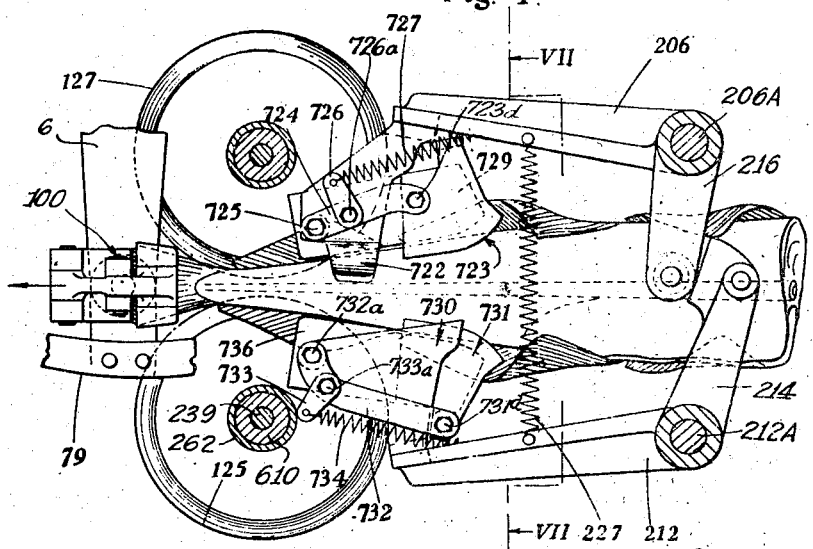
Figure 5:
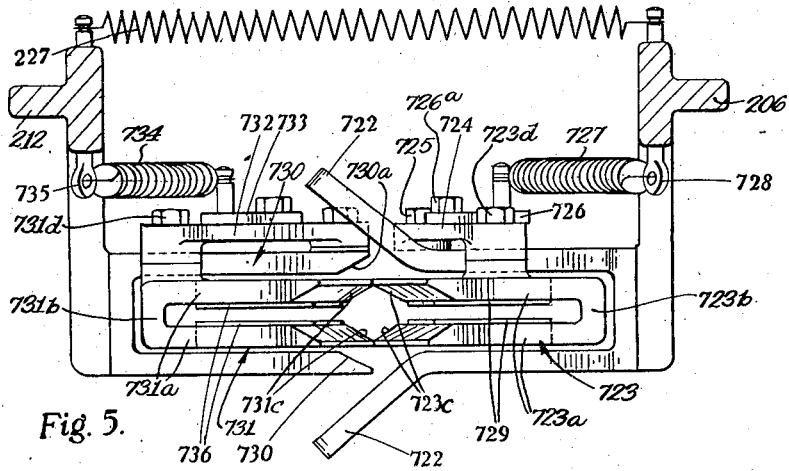
Figures 5, 6 and 7 are sections taken on the lines V—V, VI—VI and VII—VII in Figures 1, 3 and 4, respectively. These figures are drawn to a slightly larger scale than Figures 1 to 4 for the purpose of showing the structure in greater detail.
Figure 6:
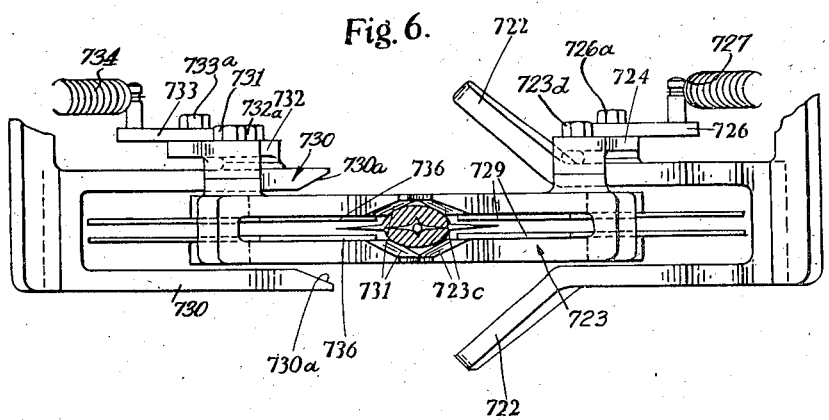
Figure 7:
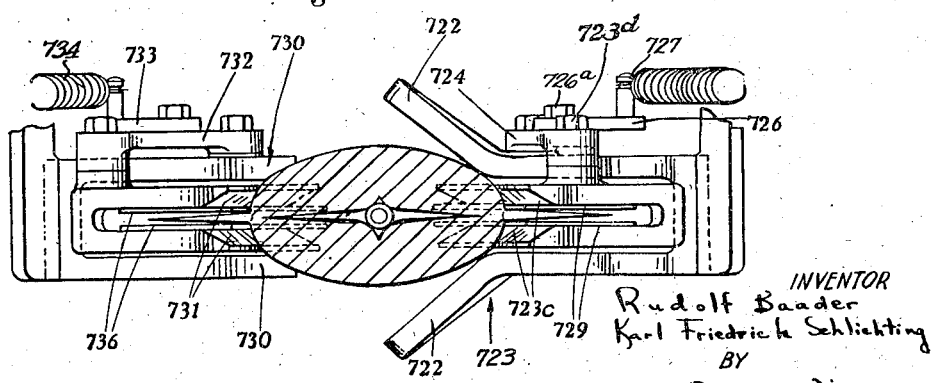
Figure 1:
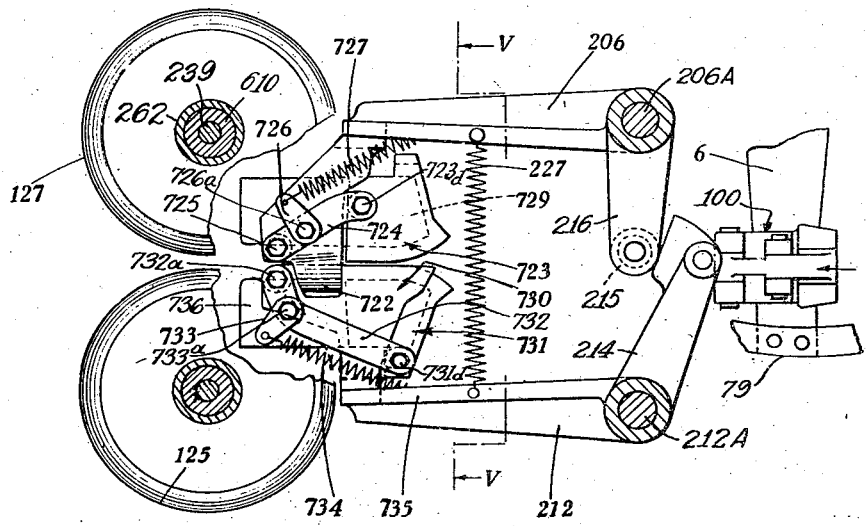
Figure 4:
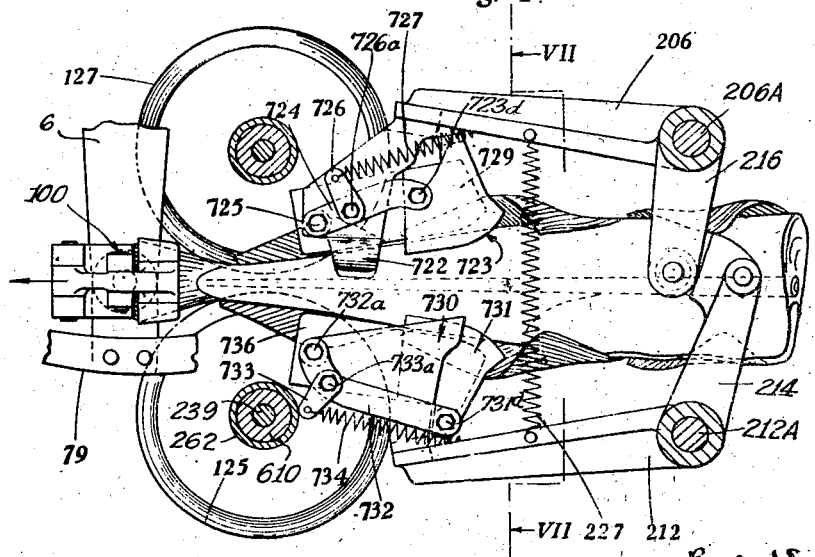
Figure 9:
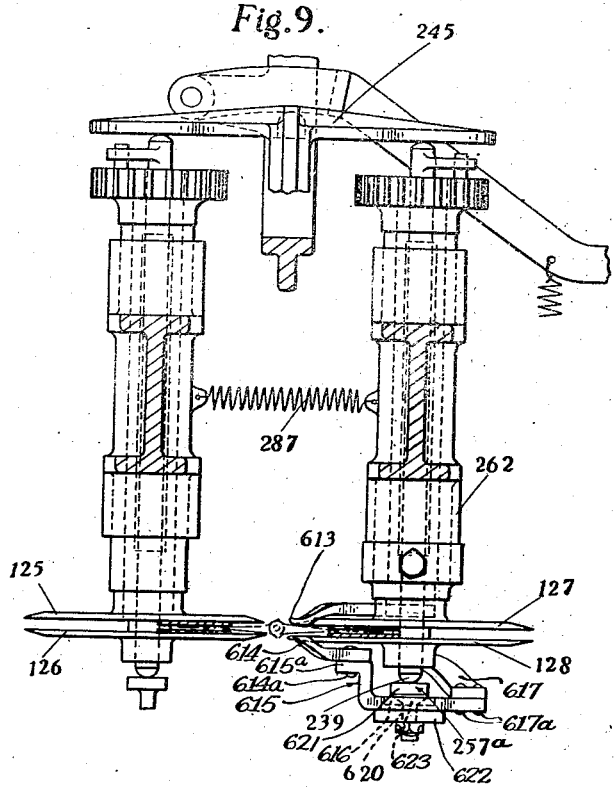
Figure 9 is a section taken on the line IX—IX of Figure 8 and showing both pairs of filleting knives and respective knife supporting structures.
Figure 11:
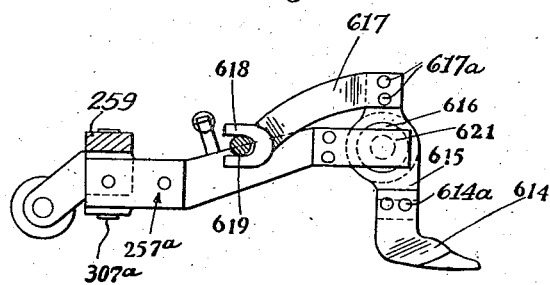
Figure 11 is a section taken on the line XI—XI of Figure 8 and showing portions of the inner cutting assembly only. In this view the knife 128, hub, and supporting spindle have been removed in order to more clearly show the structure of the forks thereunder.

When the tail clamp has cleared the guide completely the position is as shown in Figure 4. At this stage the part of the fish that is engaged by the guide is thickening and the guide members having relatively narrow fish engaging portions, namely, parts 723 and 731, are being pushed outwardly against the springs 727 and 734, and the wide V-mouth formed by the plates 722 is taking over the guiding at the back of the fish while the intermediate V-part formed by the bevelled edges of the plates 730 is also coming into engagement on the belly side of the fish and will shortly enter the belly cavity. It is moved into the belly cavity under the control of a measuring arm identical with the measuring arm 145 in the aforesaid prior patent.

It will also be seen that the guide plates 729 and 736 lead the fins cleanly between the two disc knives of each pair.

Finger-like members are associated with the inner pair of knives 127 and 128, and it is these knives and associated parts that are shown in Figure 8. The knife 127 is carried by a hollow shaft 610 and, as in the prior patent, the knife 128 is carried by a spindle 239 within the shaft 610. The spindle or shaft 239 and the rotary disc knife 128 are adapted to be moved downwardly in accordance with the size of the fish and/or the variation in the configuration of the bony structure thereof, as more completely shown and described in the aforesaid patent. Moving downwardly, the lower end of the shaft 239 bears against a part attached to a lever 257a. This lever 257a corresponds to the lever 257 of the aforesaid patent but is of different form and has, besides the function of supporting the shaft 239, the additional function of carrying lower member 614 of a pair of finger-like members which have the function, as disclosed below, of insuring that the fish be accurately presented to the disc knives 127 and 128. Lever 257a is rotatably mounted on the bracket 259 by means of a pivot pin 307a passing through a boss on the lever 257a and fixed to the bracket 259a.

The upper and lower guides 305a and 306a have a function similar to that of the corresponding guides 305 and 306 of the aforesaid patent. The upper guide 305a is attached to the bracket 259a by means of a piece of angle iron riveted to the guide and to the lever 257a, and the lower guide 306a is riveted or bolted to a horizontal surface on the lever 257a.

The spring 261 normally urges the lever 257a upwardly about its pivot point as viewed in Figure 8, and, accordingly, when the shaft 239 is lowered or raised the lever 257a is caused to rock about its pivot point in accordance with the size of the fish, under the control of the measuring arm 145b through the medium of the lever 245 in the manner disclosed in the aforesaid patent.

The hollow shaft 610 is carried in a sleeve 262 to which is fixed a ring 624 by means of a set screw 612. The ring 624 is integral with an arm 611 which rigidly carries a finger-like member 613 which lies on top of the knife 125 and projects over the edge of the knife, being of sickle-like shape from its nose to the point where it crosses the periphery of the knife. The finger-like member 613 is fixed to the arm 611 by means of rivets 613a, see Figures 8 and 10. A second finger-like member 614 is arranged in a similar way below the knife 128 and is fixed to supporting bar 15 by means of rivets 614a extending through a horizontal extension 615a thereof which extends above and parallel to the main portion of the bar 615. At the end of the supporting bar 615 opposite the extension 615a there is secured by rivets 617a an arm 617 which terminates in a fork 618.

The supporting bar 615 of the lower finger-like member 614 is pivoted to one end of the rocking arm 257a which, in this respect, differs from the rocking arm 257 of the prior patent as above stated. The arm 257a is provided at one end with the supporting member 621 riveted adjacent the extremity of the arm 257a, which member 621 supports the shaft 239 in the same manner as the arm 257 supports the shaft 239 of the prior patent. Integral with the member 257a is a bar 622 which extends therefrom with a portion which lies parallel with and below the supporting member 621, the parts 621 and 622 forming the equivalent of a pair of tines of a fork.

Supporting bar 615 is provided with a recess on the upper surface thereof to receive the disc 616 which is countersunk within its upper surface and drilled to receive the bolt 620 having a flat head 623. The bolt 620 and the disc 616, when the bolt is loosened, permit the bar 615 to pivot about the axis of the shaft 239.

A pin 619 fixed to and projecting downwardly from the carrier arm 611 enters the space between the prongs of fork 618 of the arm 617.

It will be clearly understood that with the arrangement above described, rocking of the arm 257a about its pivot 307a moves both the knife 128 and the finger-like member 614 in a vertical direction and that, if it is desired to adjust the finger-like members 613 and 614 about the axis of the disc knives 127 and 128, the set screw 612 and the bolt 620 are loosened, whereupon angular rotation of one finger-like member causes the other finger-like member to rotate through the same angle.

Figure 12:
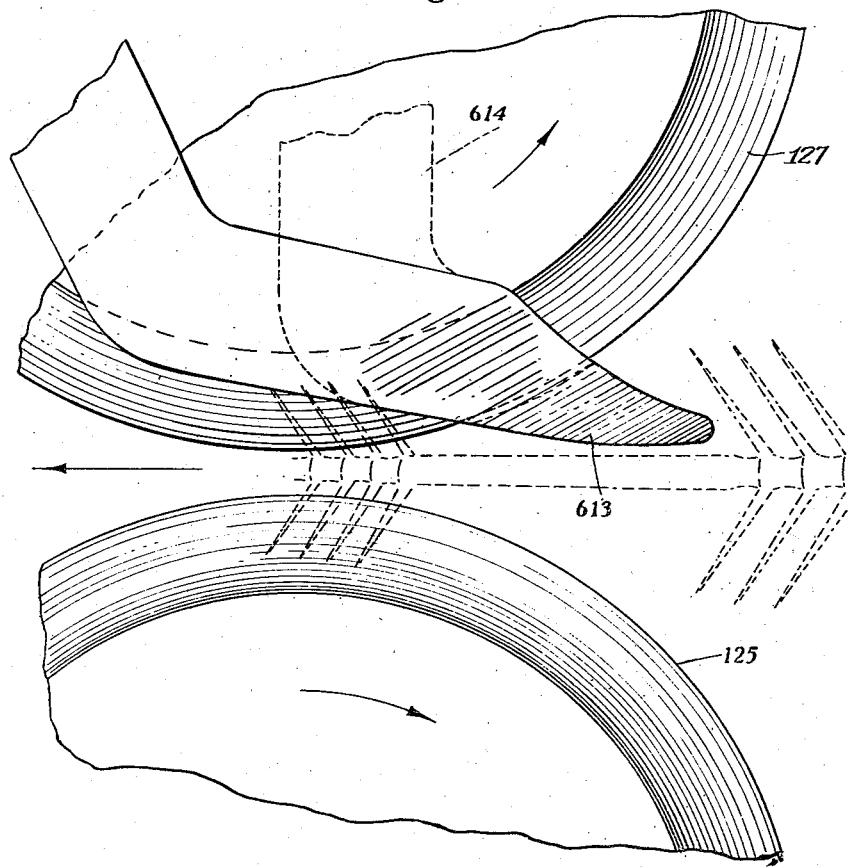
Figures 12 and 13 illustrate to a much larger scale the action of the knives and finger-like members on the fish, Figure 12 being a plan and Figure 13 being a section.

In operation the two pairs of knives are swung apart from one another to let the tail clamp pass, and then swing together under the influence of a spring 287. The arm 257a is carried by a bracket 259 which is mounted to rock about the sleeve 262, and on the other side of the fish there is a similar arm 256 carried by a bracket 258. These brackets are also swung apart to let the tail clamp pass, and they are swung together by a spring 313 just after the knives swing together. The finger-like members therefore move angularly around the knife axis to a slight extent during the closing movement. As the knives and finger-like members thus close, the finger-like members advance into the fish in a direction towards the backbone from the ridge of the back, and it is found that they can easily pierce the skin of the fish when they enter the fish at this angle. The finger-like members take up the position shown in Figures 10 and 12, and without breaking or damaging the flesh separate, cleave, or wedge it off the spike-like bones in the neighbourhood of the backbone. Since, as is clearly shown in Figures 8 and 13, the ends of the finger-like members are bent so that they form between them a slightly flared mouth, any of the spike-like bones that are distorted are easily caught in the mouth, and so the finger-like members ensure that the fish is accurately presented to the knives and that the latter do not cut the bones.

Figure 14 is a perspective view of the knives and guide mechanism taken at a time when the tail clamp is passing between the parts, all overlying parts having been removed and broken away in order to show the coaction of the elements which comprise the present invention. In this view the roller 189 on the arm 188 is shown engaging the cam 79 in order to force apart the arms 212 and 206 carrying the guide members. In this view, also, are disclosed the forked ends of the control arms 294 and 295, engaging, respectively, the sleeves 226 and 187 from which the arms 206 and 212 extend for adjusting the fin guide mechanism vertically. These forked arms function to adjust the fin guiding members vertically in accordance with the vertical adjustment of the filleting knives, and their operation is disclosed in detail in the aforesaid patent.

Figure 13:
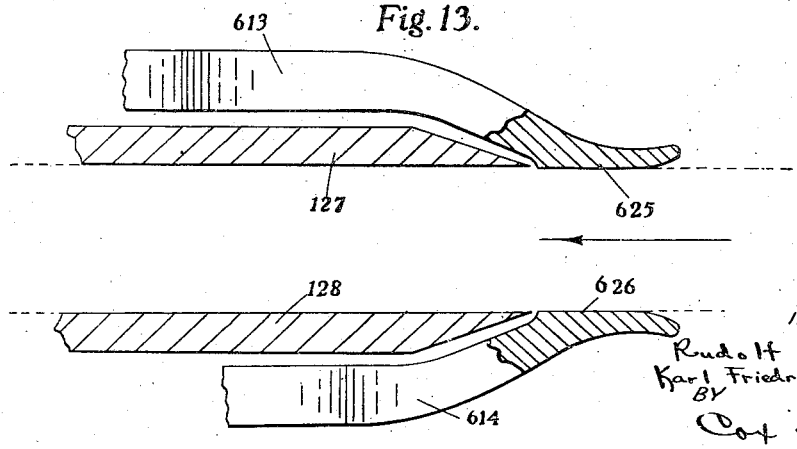

Figure 13 shows clearly that the leading edges 625 and 626 of the finger-like members 613 and 614 are spaced just closer together than the knives 127 and 128, so that the knives enter the gaps formed by the separating action of the finger-like members and in no way mangle the flesh.

We claim:
1. In a machine for dressing fish, a guide structure for delivering the fish to knives or the like comprising a guide having a relatively narrow mouth, a second guide with a relatively wide mouth, means operatively connecting and supporting said guides, means to cause a relatively narrow part of the fish to be engaged by said first named guide, and means to produce relative movement between the fish and the guides to bring a relatively wide portion of the fish adjacent the guides, said connecting and supporting means being adapted to permit the first named guide to move relatively to permit the second named guide to engage the relatively wide portion of the fish.

2. In a guide structure for guiding a fish to knives or the like, a guide adapted to engage a relatively narrow part of the fish, and a second guide adapted to engage a relatively wide part of the fish, said guides being mounted for relative movement and said mounting being adapted to permit the first named guide to engage relatively narrow parts of the fish and to move relatively to permit the second named guide to engage relatively wide parts of the fish.

3. A machine for dressing fish having filleting knives and a guide structure for delivering the fish to the knives, said guide structure comprising a relatively narrow guide member and a relatively wide guide member, means to cause said first named guide member to engage a relatively narrow part of the fish, and means to produce progressive relative movement between the fish and the guide members, said first named guide member being resiliently mounted whereby to move relatively as the thicker portions of the fish come opposite the guide members to permit said second named guide member to engage said thickened portions.

4. A machine for dressing fish having filleting knives and a guide structure for delivering the fish to the knives, said guide structure comprising a relatively narrow guide member and a relatively wide guide member, means to cause said first named guide member to engage a relatively narrow part of the fish, and means to produce progressive relative movement between the fish and the guide members, said first named guide member being resiliently mounted whereby to move relatively as the thicker portions of the fish come opposite the guide members to permit said second named guide member to engage said thickened portions, said first named guide member being adapted to receive a fin of the fish and to guide the said fin in a predetermined path toward said knives.

5. In a fish dressing machine, means to move a fish in a predetermined path, a guide adjacent said path for engaging a fish moved in said path, and means to move one end of said guide toward said path into fish engaging position, said means being operative to subsequently bring the other end of said guide toward said path in position to engage a fish passing therein.

6. In a fish dressing machine, means to move a fish in a predetermined path, an elongated guide adjacent said path for engaging a fish moved in said path and guiding the fish to cutting knives, and means to move one end of said guide toward said path into fish engaging position, said means being operative to subsequently bring the other end of said guide toward said path into position to guide the fish to the said knives.

7. In a machine for dressing fish, including substantially parallel knives, a guide part comprising guide plates for guiding a fish to the knives, fish conveying means adapted to move the fish adjacent said guide part into operative relation with the knives, means to move said guide part from the said path to permit said conveying means to pass, and means to return one end of said guide part into position to engage the fish before the conveying means has wholly cleared the guide part, said last named means being operative to bring the other end of said guide part into engagement with the fish when the conveying means has cleared the guide part.

8. In a machine for dressing fish, guide structure for delivering fish to treating instrumentalities, means adapted to grasp a fish by the tail and convey it in a predetermined path past the said instrumentalities, said guide structure comprising fin guides adjacent said path and being adapted to engage a fin of a fish for guiding the fish to said instrumentalities, and means to move the end of said fin guides nearer the oncoming fish into guiding position before the said grasping means has wholly cleared the guide structure, said means being operative subsequently to move the other end of said fin guides into fish guiding position.

9. In a machine for dressing fish, guide structure for delivering fish to treating instrumentalities, means adapted to grasp a fish by the tail and convey it in a predetermined path past the said instrumentalities, said guide structure comprising fin guides of substantial length adjacent said path and being adapted to engage a fin of a fish for guiding the fish to said instrumentalities, said guide means being relatively remote from said path to permit passage of said grasping means, and means to move the end of said fin guides nearer the oncoming fish into guiding position before the said grasping means has wholly cleared the guide structure, said means being operative subsequently to move the other end of said fin guides into fish guiding position.

10. A machine according to claim 9 having two guide structures, as defined therein, one on either side of the path taken by the fish and adapted to engage the fish therebetween.

11. A machine for dressing fish comprising a pair of spaced cutting knives adapted to cut inwardly toward the backbone of a fish, each knife having a finger-like member associated therewith, each of said finger-like members projecting forwardly of the innermost edge of the knife and being arranged in position to wedge the flesh from the backbone of the fish, said finger-like members extending laterally beyond said innermost knife edges to direct the flesh beyond the said knife edges whereby the cutting edges of the knives will pass through the space formed between the flesh and the backbone without cutting the wedged flesh while slicing the flesh at points spaced substantially from the backbone, said machine being free from knife means adapted to substantially approach the backbone in advance of said finger-like members.

12. A machine for dressing fish comprising a pair of spaced, parallel filleting knives adapted to cut inwardly toward the backbone of a fish, each knife having a finger-like member associated therewith, each of said finger-like members projecting forwardly of the innermost edge of the knife and being arranged in position to wedge the flesh from the backbone of the fish in advance of the cutting action of the knives, said finger-like members having oppositely flared forward edges for oppositely engaging and straightening the backbone of the fish while slicing the flesh at points spaced substantially from the backbone, said machine being free from knife means adapted to substantially approach the backbone in advance of said finger-like members.

13. In a machine for dressing fish comprising a rotary disk knife, means rotatably supporting said knife, a finger-like wedging member operatively connected with said knife supporting means and extending outwardly from the cutting edge of said knife to engage the backbone of the fish and wedge the flesh therefrom, said operative connecting means being adjustable to permit adjustment of the said wedging member substantially about the axis of the knife.

14. In a machine for dressing fish comprising a rotary cutting knife, means to cause relative movement between the knife and a fish in predetermined relationship to produce a cut in said fish, a wedging member having a portion extending forwardly of the cutting edge of the knife in the direction of relative movement opposite the backbone to engage the backbone of the fish and wedgingly separate the flesh therefrom, said wedging member having a surface adapted to direct the separated flesh away from the backbone at all points ahead of the knife and outwardly of the plane of the cutting edge of the knife whereby the knife edge operates through an open space at all points adjacent the backbone, said machine being free from knife means adapted to substantially approach the backbone in advance of said wedging member.

15. In a machine for dressing fish, a pair of finger-like wedging members spaced a predetermined distance, means for producing relative movement between said relative finger-like members and a fish to cause the finger-like members to pass oppositely along the backbone of the fish to wedgingly separate the flesh therefrom, and means to control the spacing of the said finger-like members in accordance with the thickness of the backbone of the fish, said machine being free from knife means adapted to substantially approach the backbone in advance of said finger-like members.

16. In a machine for dressing fish comprising a pair of spaced, finger-like wedging members, means to cause said finger-like members to penetrate the flesh of a fish and to move toward the backbone thereof, said members being spaced at all points adjacent their extremities, and means to produce relative movement between the wedging members and the fish longitudinally of the backbone thereof whereby to separate the flesh from the backbone.

17. A machine for dressing fish comprising means for separating the flesh from the bony structure by wedging the flesh of the fish off the backbone in a direction generally longitudinally thereof, means for holding the separated flesh in spaced relation to the backbone, and means for making a cut inwardly toward said wedged off portion without cutting the flesh so separated.

18. A machine for dressing fish comprising means for separating the flesh from the bony structure by parallel cuts in the fish extending inwardly toward the backbone, and means arranged in advance of all flesh-cutting means for wedging the flesh off the backbone without producing cuts in the flesh so separated, said wedging means being constructed and arranged to hold the wedged flesh away from the backbone adjacent the inner edge of the cutting means.

19. In a fish-dressing machine having means to move a fish in a predetermined path past treatment instrumentalities, a guide adjacent said path for engaging a fish moved in said path, and means to move one end of said guide toward said path in a fish-engaging position and to subsequently bring the other end of said guide toward said path in position to engage a fish passing therethrough.

20. In a fish-dressing machine having means to move a fish in a predetermined path past treatment instrumentalities, guide means adjacent said path and comprising a narrow guide member and a wide guide member, means for moving said guide means toward said path in a fish-engaging position, and resilient means adapted to bias said narrow guide member toward fish-engaging position so as to first arrive in fish-engaging position.

21. In a machine for dressing fish comprising a rotary disc knife, means rotatably supporting said knife, and a wedging member operatively connected with said knife-supporting means and extending forwardly from the cutting edge of the knife to engage the backbone of the fish and wedge the flesh therefrom, said wedging member having a fixed relationship ahead of a predetermined portion only of the cutting edge of said knife such that the knife idles in a space between the backbone and the knife edge while severing the flesh at points positioned substantially outwardly from the backbone in the plane of the knife.

22. In a machine for dressing fish, guide means for guiding the fish to treating instrumentalities, means to move the fish in a predetermined path adjacent said guide means, said guide means comprising oppositely-confronting guide members on either side of the path of the fish for coincidentally engaging a fish on the back and belly portions thereof, each guide member having portions adapted to engage the body of the fish for guiding the fish in said path, each guide member also comprising a pair of relatively thin guide plates, disposed in parallel relation to the natural position of the fins extending centrally of the back and belly portions, and arranged to engage said fins of the fish for additionally guiding and positioning the fish with respect to the treating instrumentalities.

RUDOLF BAADER.
KARL FRIEDRICH SCHLICHTING.